United States Patent [19]

Miller et al.

[11] Patent Number: 5,395,808

[45] Date of Patent: Mar. 7, 1995

[54] INORGANIC SUPPORTS FOR BIOREMEDIATION

[75] Inventors: James G. Miller, Ellicott City; Michael J. Wax, Bethesda; Richard F. Wormsbecher, Highland, all of Md.

[73] Assignee: W. R. Grace & Co.-Conn., New York, N.Y.

[21] Appl. No.: 994,222

[22] Filed: Dec. 21, 1992

[51] Int. Cl.⁶ .................... B01J 21/16; B01J 35/10; C12Q 1/00
[52] U.S. Cl. ........................... 502/7; 502/62; 502/63; 435/4; 435/176
[58] Field of Search .............. 502/4, 7, 62, 63, 80; 435/4, 176

[56] References Cited

U.S. PATENT DOCUMENTS

| | | | |
|---|---|---|---|
| 3,034,994 | 5/1962 | Braithwaite et al. | 502/63 |
| 3,892,580 | 7/1975 | Messing | 106/41 |
| 3,957,689 | 5/1976 | Ostermaier et al. | 502/65 |
| 4,153,510 | 5/1979 | Messing et al. | 195/59 |
| 4,279,779 | 7/1981 | Sanchez et al. | 502/332 |
| 4,581,338 | 4/1986 | Robertson et al. | 502/8 |
| 5,128,291 | 7/1992 | Wax et al. | 502/8 |

FOREIGN PATENT DOCUMENTS

| | | | |
|---|---|---|---|
| 967136 | 5/1975 | Canada. | |
| 256359 | 2/1988 | European Pat. Off. . | |
| 2063911 | 7/1971 | France | 502/80 |
| 0004490 | 1/1977 | Japan | 502/63 |
| 0024635 | 2/1982 | Japan | 502/63 |
| 2071076 | 9/1981 | United Kingdom | 502/63 |
| 0483999 | 9/1975 | U.S.S.R. | 502/63 |

OTHER PUBLICATIONS

Beeckman & Hegedus "Design of Monolith Catalysts for Power Plant NOx Emission Control," in Industrial & Engineering Chemistry Research, vol. 29, pp. 969–978, 1991.

*Primary Examiner*—Carl F. Dees
*Attorney, Agent, or Firm*—Beverly K. Johnson

[57] ABSTRACT

Porous bodies are produced which are suitable for use as supports for catalysts, including living cells, such as bacteria. The bodies have a significantly large average pore diameter of about 0.5 to 100 microns, (i.e. 5,000 to 1,000,000 Å) and a total pore volume of about 0.1 to 1.5 cc/g with the large pores contributing a pore volume of from about 0.1 to 1.0 cc/g. The bodies are made by preparing a mixture of ultimate particles of bound clay, one or more optional ingredients such as inorganic binders, extrusion or forming aids, burnout agents, or a forming liquid, such as water. In a preferred embodiment, the ultimate particles are formed by spray drying.

37 Claims, No Drawings

INORGANIC SUPPORTS FOR BIOREMEDIATION

BACKGROUND OF THE INVENTION

1. Field of the Invention

2. Description of Prior Art

Many porous inorganic supports have been made using a variety of techniques. These include sol-gel synthesis, as taught by U.S. Pat. No. 4,279,779, drying and calcination of slurries of colloidal inorganic particles, with or without the use of binders, e.g., U.S. Pat. Nos. 3,892,580 and 5,128,291, and the use of burnout agents, taught by European Patent 256,359. However, in almost all cases the pores in these supports have been quite small, with diameters typically less than 1 μm (10,000 Å) and most often less than 1000 Å, and the preparation methods employed are not easily extended to larger pore diameters. Thus, the pore diameters described in earlier patents have been too small for some catalytic species, e.g., bacteria and other microorganisms. Further, gaseous diffusion is slow in these smaller pores. Many of the above-noted preparation methods also do not lend themselves to the preparation of bodies of arbitrary size and shape without the use of additional processing steps.

As alternatives to inorganic supports, organic materials with large pores have been made, such as macroreticular polystyrene. However, these materials often do not have good dimensional stability: they are subject to swelling in many solvents, and to being deformed under pressure. Further, organic materials often may be degraded under catalytic conditions, e.g., by extreme heat, by oxidizing conditions, or by the action of bacteria or other microorganisms.

U.S. Pat. No. 4,153,510 teaches composites of microbes bonded to the internal surfaces of large-pore inorganic materials. However, it does not teach methods of preparation or compositions which will have the desired properties.

U.S. Pat. No. 4,581,338 teaches the preparation of a spherical, large-pore, catalyst-containing support from diatomite. Large pores are introduced to the support through the addition of burnout agent during processing. Because the diatomite is relatively unreactive, added fluxing agent and high calcination temperatures are required in order to form spheres with good physical strength.

U.S. Pat. No. 3,034,994 teaches the use of extrusion of smaller particles to form macroscopic porous supports. However, if the smaller particles are not strong enough to withstand the rigors of extrusion, then they will be crushed to produce a support with low porosity. Further, if particles with insufficiently large dimensions are used, then no large pores can be formed in the interstices between these particles.

Thus the existing materials and the methods for their preparation have one or more flaws. These include insufficiently large pore diameter in the 0.5 to 100 micron range, difficulty in tailoring pore size to a specified range, the necessity for added burnout agents to introduce porosity, poor physical integrity or dimensional stability, difficulty in processing, and the ability to produce only specified shapes and sizes of bodies. In short, a method of preparation of supports which is easier and more readily tailored to specifications is to be desired. Further benefit would accrue from the ability to add additional reagents/catalysts/adsorbents to the support during processing and the potential for higher cell densities or microbial activities in the finished catalyst, if microbes are used as the catalytically-active species.

3. Objects of the Invention

It is an object of this invention to provide formed inorganic bodies with very large pores and good physical strength, as well as a process for their preparation.

It is a further object of this invention to provide a macroporous catalyst support.

It is a further object of this invention to provide a macroporous catalyst support with specified macropore diameters.

It is a further object of this invention to provide a macroporous catalyst support which allows more rapid diffusion of gases into the support than would be possible in a purely microporous support.

It is a further object of this invention to provide a support with pores large enough to accommodate large catalytic species.

It is a further object of this invention to provide a support for bacteria and other microorganisms.

These and other objects of the current invention will become obvious as the description below proceeds.

SUMMARY OF THE INVENTION

Porous bodies are produced which are suitable for use as supports for catalysts, including living cells, such as bacteria. The bodies can be designed to have a significantly large average pore diameter of about 0.5 to 100 μm, (i.e. 5,000 to 1,000,000 Å) and a total pore volume of about 0.1 to 1.5 cc/g with the large pores contributing a pore volume of from about 0.1 to 1.0 cc/g. The bodies are made by preparing a mixture of:

(a) ultimate particles, comprising an inorganic oxide such as clay in the preferred embodiment and optional inorganic binder components and/or other functional components, with good mechanical strength, as specified by a Davison Index of less than about 20;

(b) one or more optional inorganic binders, such as peptized alumina;

(c) one or more optional extrusion or forming aids;

(d) one or more optional burnout agents; and, (e) an optional liquid, typically water.

In a preferred embodiment, the ultimate particles are formed by spray drying. The mixture of ultimate particles and other ingredients is formed into bodies through extrusion, pelletization, balling, or other suitable process, and these bodies then are optionally dried and calcined.

Spaces between the ultimate particles become the pores in the finished bodies. Calcination may be necessary to combust any organic matter which blocks these spaces. This includes optionally added burnout agents which increase the porosity by further separating the ultimate particles.

In addition to use as a support for catalysts, the porous bodies also may be useful as adsorbents or in filtration devices.

DETAILED DESCRIPTION OF THE INVENTION

By varying the components in the preparation mixture, the properties of the finished bodies can be altered. Preferably, the finished bodies will have an average pore diameter of 0.5 to 100 μm, although the exact choice of pore diameter will depend upon the application. If, for example, rapid gaseous diffusion into the body is most important or the catalytic species is very large, a larger pore diameter will be desired. If, as a counter example, maximum surface area is necessary for catalytic activity, then a smaller pore diameter will be most appropriate, surface area being linearly related to pore diameter at constant pore volume.

The pore volume of the finished bodies also will vary with the intended application, but will range from about 0.1 to 1.5 cc/g. Pore volume in the large pores with diameters ranging from 0.5 to 100 μm will range from about 0.1 to 1.0 cc/g. A preferred embodiment has the large pores contributing a pore volume of from about 0.15 to 0.6 cc/g. Increased pore volumes correspond to higher surface areas (at constant pore diameter) and provide more space in which large catalyst species may reside, but also typically result in decreased crush strengths.

Porous body size and shape will be dictated by the circumstances of use. Typical shapes include spheres, cylinders, rings, and honeycombs. Typical formed products have a diameter of at least 250 microns. Preferred combinations of size and shape are spheres or cylinders of up to 1 cm for fluidized beds; spheres, cylinders, or rings of from 1 mm to 5 cm for fixed beds; and square monoliths up to 1 m long for high space velocity applications.

In order to prevent destruction of the bodies during shipping or use, these should have reasonable mechanical strengths. For bodies with dimensions of about 3 mm, this requirement corresponds to crush strengths greater than about five pounds, as measured using a testing machine such as the Pfizer Hardness Tester Model TM141-33, manufactured by Charles Pfizer and Co., Inc. 630 Flushing Avenue, Brooklyn, N.Y. The porous bodies are placed between two parallel plates of the machine and plates are slowly brought together by hand pressure. The amount of force required to crush the particle is registered on a dial which has been calibrated in pounds force. A sufficient number (for example, 50) of particles is crushed in order to get a statistically significant estimate for the total population. The average is calculated from the individual results. Higher crush strengths may be desirable in demanding applications. Further, for use in fluidized beds or to prevent losses during filling fixed beds, good attrition resistance is desired.

For these large size particles they should have an attrition of less than 20%, and preferably less than 10% attrition. The attrition loss test involves selecting a set volume (60 cc.) of material to be tested which is placed in an inverted Erlenmeyer flask of special construction which is connected to a metal orifice inlet. A large (one inch) outlet covered with 14-mesh screening is located on the flat side (bottom) of the flask. High velocity dry nitrogen gas is passed through the inlet orifice causing the particles to: (1) circulate over one another thus causing attrition, and (2) impact themselves in the top section of the flask thus breaking down as a function of strength. The material is tested for five minutes and the remaining particles are weighed. The loss in weight after testing expressed as percent of the initial charge is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

The ultimate particles which are used to form the porous bodies are composed of an inorganic oxide or mixture of inorganic oxides and a combination of any of a number of optional ingredients. A typical class of inorganic oxides is clay. By clay is meant any of the class of natural or synthetic hydrated aluminosilicates, with a general composition of $(Al_2O_3)_n(SiO_2)_m \cdot xH_2O$, although other elements also may be present. These aluminosilicates may be amorphous or crystalline in two dimension with low ion-exchange capacity. In a preferred embodiment, the clay is a natural clay such as kaolin. The amount of clay present in the ultimate particles will range from 20 to 100%, and more preferably from 60 to 100%.

Optional ingredients in the ultimate particles include inorganic binders and other functional materials. Binders serve the function of holding the particles together if the inorganic oxide is available only as a very finely divided powder, or if the particles do not have good structural integrity. Binders include metal salts, oxides, and hydroxides, and their precursors and reaction products, as well as other materials, and the choice of binder will depend upon the inorganic oxide used and the manner by which it has been processed into particles. Similarly, the amount of binder necessary, if any, will be a function of the inorganic oxide. When the kaolin clay is used, preferred binders are silica, silicic acid, sodium silicate, alumina, aluminum chlorohydrol, and aluminum sulfate. These binders will be present in amounts ranging from 0 to 50% and more preferably from 0 to 25%.

Other functional materials which optionally may be added to the ultimate particles include catalysts and reagents, either singly or in combination. These functional particles will be present in amounts ranging from 0 to 50%. Incorporation of catalyst into the ultimate particles may eliminate the need for a step to introduce catalyst to the bodies after they are formed. Alternatively, catalytic species in the ultimate particles may serve different functions than catalytic species in the pores between particles. Catalysts typically will be in the form of metals or metal oxides.

Optional reagents in the ultimate particles may serve any of a number of functions. These may include, but are not limited to, allowing the porous body to function as a reagent, augmenting the function of a catalytic species for which the porous body is a support, preventing microbial or fungal growth, and increasing the strength of the body. Examples of reagents are oxidants, e.g., perborate, nutrients which might enhance the growth of bacteria to be used as catalysts, and biocides if such growth is to be prevented.

The ultimate particles may be formed by any suitable method which confers upon them the requisite physical integrity, as described below. In a preferred embodiment, the particles are produced by spray drying an aqueous mixture of the clay and any optional components. This route is illustrated well by U.S. Pat. No. 3,957,689 and Canadian Patent 967,136. The quantity of ultimate particles to be used will range from about 50 to 100%, and preferably from about 75 to 100%, of the total weight of the mixture used to form the porous bodies prior to the addition of any optional liquids.

Porosity is introduced to the bodies during their assembly from the ultimate particles. It is believed that the spaces between the starting particles are the pores in the finished bodies. By changing the diameters of the ultimate particles, it is possible to change the diameters of the pores. In fact, the particle size necessary to achieve a given pore size may be estimated as follows:

$$D = \frac{3d}{2\sqrt{3} - 3},$$

where D is the particle diameter, and d is the pore diameter. This model assumes monodisperse, close-packed spherical particles. Similar relationships can be derived using other arrangements of particles of alternate shape and non-uniform size. Based upon this reasoning, ultimate particles of about 1 to 1000 μm diameter are preferred.

A key aspect of this invention is the use of ultimate clay particles with sufficient physical integrity (mechanical strength and attrition resistance) to survive the forces generated in extrusion and other forming methods. If the ultimate particles do not possess the requisite physical integrity, they will be crushed, deformed, or attrited during the forming processes, with the result that the loose material will fill the interparticle spaces in the support. Thus, there will be little porosity in supports formed from soft or weak particles.

A useful measure of the physical integrity is the Davison Index for attrition for very small particles. This is determined using an Amico roller particle size analyzer fitted with a one inch (i.d.) jet cup with a 0.0625 inch orifice. In a 60 minute test at an air flow rate of 21 liters per minute on a 20+ μm sample, the Davison Index value is equal to the percentage of 0 to 20 micron-sized material formed as a fraction of the original sample. According to this measure, the ultimate clay particles of the current invention should have maximum Davison Index values of about 20. Preferably, these values will be less than 10 and, most preferably, less than 5.

Other optional ingredients in the mixture which is to be used to produce porous bodies are binders, extrusion or forming aids, burnout agents, and liquids, typically water. Binders will help to hold the bodies together, and typically will include metal salts, oxides, and hydroxides, and their precursors and reaction products, the choice of which will depend upon the clay and other components present in the bodies. Preferred binders for use with kaolin-based particles are silica, silicic acid, alumina, and peptized alumina. The quantity of binders to be used will range from 0 to about 50%, and preferably from 0 to about 25%, of the total weight of the mixture used to form the porous bodies prior to the addition of any optional liquids.

Extrusion and forming aids, if used, will help to ease the process used to form the porous bodies, and may improve their green strength before calcination. Typical aids will include surfactants. A preferred extrusion aid is methyl cellulose. The quantity of optional extrusion aids to be used can range from 0 up to about 50% and preferably up to about 25%, of the total weight of the mixture used to form the porous bodies prior to the addition of any optional liquids.

Burnout agents, if used, may impart increased porosity or pores of alternate size to the porous bodies. Typical burnout agents include carbon and various natural and artificial polymers, such as starch and methyl cellulose. The quantity of the optional burnout agents to be used will range from 0 to about 50%, and preferably up to about 25%, of the total weight of the mixture used to form the porous bodies prior to the addition of any optional liquids.

Finally, an optional liquid, if used, may aid forming of the bodies. It also may increase porosity by leaving voids within the bodies upon evaporation. A preferred liquid is water, although non-aqueous liquids may be useful in some circumstances. For example, in cases where the high surface tension of water leads to pore collapse on evaporation, lower surface tension organic liquids such as acetone may help to prevent a loss of porosity. The amount of optional liquid to be used will range from 0 to about 75% of the total weight of the ingredients used.

Useful methods for forming bodies include extrusion, pelletization, balling, and granulating, among others. After being formed, the bodies optionally may be dried and calcined. Drying will allow removal of any evaporable liquids from the bodies prior to their use, and may result in enhanced crush strength or physical integrity. Although any effective drying temperature may be used, preferred temperatures will range from room temperature to about 200° C. Suitable calcination temperatures will depend upon the function to be fulfilled by the calcination step, and the conditions to which the bodies will be subject. Suitable temperatures for complete combustion of any organic materials in the bodies after forming will typically be in the range of 400°–700° C. For imparting greater strength to the bodies, a temperature which results in at least some sintering or vitrification of the clay and other ingredients will be necessary. Temperatures greater than about 400° C. should be suitable for this purpose.

The porous bodies of the current invention may find use in a number of applications, only some of which are enumerated here. The large pores of the bodies will make them particularly useful as catalyst supports for two reasons. First, the rate of gaseous diffusion in pores increases with increasing pore diameter. Thus, in the case where intraparticle diffusion limits the rate of a catalyzed reaction, use of a support with the present large pores as is described herein will enhance the rate of product formation. For example, selective catalytic reduction of nitrogen oxides with vanadium-impregnated monolith catalysts is accelerated by the introduction of large pores to the monolith, as taught by Beeckman and Hegedus in "Design of Monolith Catalysts for Power Plant $NO_x$ Emission Control," in Industrial & Engineering Chemistry Research, Volume 29, pp. 969–978, 1991.

Second, large pores in the body will allow large catalytic species to be supported within these pores. Of particular interest is the use of living microorganism cells, e.g., bacteria, as catalysts: bacteria are large, with dimensions on the order of 1 μm or greater, and thus will not fit in smaller pores. While bacteria will form colonies on non-porous materials, the additional surface area which is available within the pores should foster larger bacterial populations. Further, bacteria in pores will be protected from transient upsets in the external medium because diffusion into the pores will be relatively slow. This is particularly true of upsets characterized by a sudden high concentration of some compound which may be toxic to the bacteria or by sudden changes in pH or ionic strength. Bacteria supported on porous supports also may be resistant to longer term upsets, such as temporary oxygen or nutrient starvation caused, for example, by equipment failures.

Bacteria and other microorganisms immobilized on porous supports will have a variety of uses. This includes the biotreatment of aqueous waste streams, and the biofiltration of gases. Other uses include bioorganic synthesis of fine and commodity chemicals, and any other use for which bacteria are suitable.

Many types of bacteria are contemplated as being able to exist in the large pores. Examples include bacteria from the following genera: Pseudomonas, Acinetobacter, actinomycetes, Mycobacterium, Corynebacterium, Arthrobacterium, Bacillus, Flavobacterium, Nocardia, Achromobacterium, Alcaligenes, Vibrio, Azotobacter, Beijerinckia, Xanthomonas, Nitrosomonas, Nitrobacter, Methylosinus, Methylococcus and Methylobacter. Additional microorganisms include members of the fungi, yeast, algae and protozoans.

In addition to their utility as catalyst supports, the porous bodies of the current invention will also be useful for adsorption of one or more components from gaseous or liquid mixtures, with enhanced diffusion rates giving them an advantage over conventional small-pore materials in gaseous mixtures. Further uses will include absorption of liquids and as carriers for reagents. In all of these applications, the bodies may be used without modification, or after treatment or impregnation with materials with the necessary properties.

Having described the basic aspects of our invention, the following examples are given to illustrate specific embodiments thereof.

EXAMPLE 1

This example illustrates the laboratory-scale preparation of $\frac{1}{4}''$ diameter, 1:1 aspect ratio cylindrical extrudates with macropores in the 10 $\mu$m range.

Catapal SB alumina (206 g) was mixed with 4.86% nitric acid solution (509.7 g) in a small beaker. To the peptized alumina were added Davison Super D matrix, a spray-dried bound clay with a Davison Index of less than 10 (950 g of a fraction sieved to between 75 and 180 $\mu$m), and then methylcellulose (Dow Methocel 20-213, 48.4 g). The resulting mixture was extruded through a $\frac{1}{4}''$ die with 1" extruder. After being dried in air, the extrudates were cut to a 1:1 (length:diameter) aspect ratio, and then were calcined at 550° C. for two hours, after being ramped to temperature at 5° C./minute.

The product had a total pore volume (by mercury porosimetry) of 0.501 cc/cc, of which 0.300 cc/cc was in pores of 1000 Angstrom or greater diameter. The distribution of the 1000+ Angstrom pores peaked at a diameter of 9-11 $\mu$m. The crush strength of the extrudates was 40 lb.

EXAMPLE 2

This example illustrates the laboratory-scale preparation of $\frac{1}{4}''$ diameter, 1:1 aspect ratio cylindrical extrudates with macropores in the 25 $\mu$m range. The increased macropore diameter produced is by the use of a larger mean ultimate particle diameter.

The procedure of Example 1 was repeated, but with 180-300 $\mu$m Super D particles used in place of the 75-180 $\mu$m particles of Example 1. The product had a total pore volume (by mercury porosimetry) of 0.550 cc/cc, of which 0.380 cc/cc was in pores of 1000 Angstrom or greater diameter. The distribution of the 1000+ Angstrom pores peaked at a diameter of 21-26 $\mu$m. The crush strength of the extrudates was 28 lb.

EXAMPLE 3

This example illustrates the pilot plant-scale preparation of $\frac{1}{4}''$ diameter, 1:1 aspect ratio cylindrical extrudates with macropores in the 10 $\mu$m range.

Nitric acid solution (5.71 lb of 70 wt % nitric acid and 81.0 lb of water) and Catapal B alumina (32.5 lb, equivalent to 22.8 lb on an anhydrous basis) were blended in a 50 gallon Sigma mixer to form a homogeneous gel. While the mixer was running, Davison Super D matrix (156.8 lb of a fraction sieved to between 75 and 180 $\mu$m) was added to the gel, and the resulting mixture was again blended to homogeneity (about 10 minutes). After addition of methylcellulose (Dow Methocel 20-213, 7.81 lb) and an additional 10 minutes of blending, the mixture was extruded with a 2" Welding extruder to form $\frac{1}{4}''$ pellets. These were air-dried overnight, then calcined at 550 ° C. for 4 hours. The product had a total pore volume (by mercury porosimetry) of 0.476 cc/cc, of which 0.257 cc/cc was in pores of 1000 Angstrom or greater diameter. The distribution of the 1000+ Angstrom pores peaked at a diameter of 9-11 $\mu$m.

EXAMPLE 4

This example illustrates the preparation of a 7.5 pitch rectangular monolith, and its coating with titania to produce a support for a selective nitrogen oxide reduction catalyst.

Nitric acid solution (83 g of 70 wt % nitric acid and 1112 g of water) and Davison VFA alumina (472.9 g) were blended in a small Sigma mixer for 15 minutes. Davison Super D matrix (2290 g of a fraction sieved to between 75 and 180 $\mu$m) was added to the mixer, which was run for an additional 5 minutes. After addition of methylcellulose (Dow Methocel 20-213, 113.5 g) and a further 5 minutes of blending, the mixture was extruded through a 3×3 cell, 7.5 pitch monolith die on a 2" Welding extruder; the extrusion pressure at the die face was about 150-200 lb. The monoliths were air-dried under plastic for about one week, and then calcined at 575 ° C. for 3.5 hours.

To produce a support for a nitrogen oxide selective reduction catalyst, a monolith was dipped in a 9.4 wt %-$TiO_2$ content titanyl sulfate solution. Excess solution was allowed to drip off of the monolith, which then was dipped in a 1M solution of ammonium hydroxide, and finally washed with water. This process was repeated two times to increase the titania content of the support.

EXAMPLE 5

This example illustrates the use of $\frac{1}{4}''$ cylindrical extrudates as supports for bacteria.

The number of cells adhering to extrudates was determined using the plate count method. To a one liter roller bottle were added 81 milliliters of basal salts medium (BSM) and 30 g of extrudates. After the addition of phenol (750 ppm) to the mixture to serve as a carbon and energy source, the roller bottle was inoculated with 9 milliliters of an actively growing, phenol-degrading microorganism, Pseudomonas aeruginosa. The roller bottle was incubated at ambient temperature and rolled at 4 rpm on a cell-production roller apparatus (Bellco Biotechnology). The growth medium was changed daily. Growth in the liquid medium was monitored by measuring optical density at 600 nm; pH and phenol concentration also were monitored.

At days seven and ten, two extrudates were removed from the roller bottle (i.e., four total). Under aseptic conditions, each extrudate was rinsed briefly to remove planktonic bacteria, and then weighed. Each extrudate was crushed in 3–5 milliliters of BSM to form a suspension, which was decanted into a tube, mixed by vortexing, and serially diluted. The diluted suspensions were spread onto Trypticase Soy Agar (Difco), and the agar plates incubated at 30° C. Based upon the dilution factors and the weights of the extrudates, the number of microorganisms per gram of support was calculated. At day seven, the mean number of colony forming units per gram of support was $1.4 \times 10^7$, and at day ten, $2.2 \times 10^8$.

The extrudates also were analyzed for microbial colonization by scanning electron microscopy. Micrographs revealed an extensive population of microorganisms on the extrudate surface.

EXAMPLE 6

This example illustrates the performance of a packed column of cylindrical extrudates colonized with bacteria for the degradation of phenol.

A culture of phenol-grown *Pseudomonas aeruginosa* was pumped continuously through a 2.1 liter Kontes glass column packed with ¼" extrudates until substantial biomass was evident on the extrudates. The colonized bioreactor then received an influent stream of phenol and BSM. Microorganisms in the head space of the column were recycled through the system at a 12:1 recycle ratio. Oxygen required for phenol dissimilation was introduced through the recycle line at the base of the column.

With a simulated waste stream containing 100 ppm phenol, 94.3% of the phenol was degraded with a retention time of 12.3 hours. Increasing the influent phenol concentration to 1000 ppm with a simultaneous increase in residence time to 26 hours gave 99.5% degradation of phenol.

It is understood that the foregoing detailed description is given merely by way of illustration, and that many variations may be made therein without departing from the spirit of this invention.

What is claimed is:

1. A macroporous inorganic oxide catalyst support comprising a plurality of inorganic oxide particles having a particle size of 1 to 1000 microns and an inorganic binder which binds said inorganic oxide particles together in a manner such that macropores are formed throughout the catalyst support, said catalyst support having a total pore volume of 0.1 to 1.5 cc/g; macropores with pore diameters as measured by mercury porosimetry of from about 0.5 to 100 microns, said macropores providing a pore volume of from 0.1 to 1.0 cc/g; and a crush resistance of greater than 5 pounds when measured on supports having a minimum dimension of 3 mm.

2. An inorganic oxide catalyst support according to claim 1, wherein the inorganic oxide particles comprise clay particles.

3. An inorganic oxide catalyst support according to claim 2, wherein the clay particles are comprised of natural or synthetic hydrated aluminosilicates and are preferably kaolin.

4. An inorganic oxide catalyst support according to claim 2, wherein the clay content of the inorganic oxide particles ranges from 20 to 100% and preferably 60 to 100%.

5. An inorganic oxide catalyst support according to claim 2, wherein the inorganic oxide particles comprise a plurality of inorganic oxide particles bonded together with an inorganic binder selected from silica, silicic acid, alumina, a hydrated alumina or aluminum chlorohydrol.

6. An inorganic oxide catalyst support according to claim 5, wherein the inorganic binder is present in the inorganic oxide particles in an amount ranging from 0 to 50% and preferably from 0 to 25%.

7. An inorganic oxide catalyst support according to claim 5, wherein the inorganic oxide particles are formed by spray drying a slurry of clay particles and inorganic binder.

8. An inorganic oxide catalyst support according to claim 1 which further comprises a catalytically effective amount of a microorganism deposited thereon.

9. An inorganic oxide catalyst support according to claim 8 wherein the microorganism is a bacteria selected from the group consisting of Pseudomonas, Acinetobacter, Mycobacterium, Actinomycetes, Corynebacterium, Arthrobacterium, Bacillus, Flavobacterium, Nocardia, Achromobacterium, Alcaligenes, Vibrio, Azotobacter, Beijerinckia, Xanthomonas, Nitrosomonas, Nitrobacter, Methylosinus, Methylococcus and Methylobacter.

10. An inorganic oxide catalyst support according to claim 8, wherein the microorganism is selected from the group consisting of fungi, yeast, algae and protozoans.

11. An inorganic oxide catalyst support according to claim 2, wherein the inorganic oxide particles have a mean diameter ranging from 1 to 1000 µm.

12. An inorganic oxide catalyst support according to claim 2, wherein the inorganic binder is present in the catalyst support in an amount ranging from up to 50% and preferably from up to 25%.

13. An inorganic oxide catalyst support according to claim 12, wherein the inorganic binder is a metal salt, metal hydroxide, or metal oxide.

14. An inorganic oxide catalyst support according to claim 12, wherein the inorganic binder is silica, silicic acid, alumina, a hydrated alumina, or aluminum chlorohydrol.

15. An inorganic oxide catalysts support according to claim 2, wherein the macropores provide a pore volume of from about 0.15 to 0.6 cc/g.

16. A method of preparing a macroporous, inorganic oxide catalyst support comprising:
   i) preparing a mixture comprising a plurality of inorganic oxide particles having a particle size of 1 to 1000 microns and an inorganic binder capable of binding said inorganic oxide particles;
   ii) forming the mixture into a desired shape to form a catalyst support having a minimum dimension of about 250 µm; macropores having a diameter in the range of 0.5 to 100 µm distributed throughout and providing a pore volume of from 0.1 to 1.0 cc/g; a pore volume of 0.1 to 1.5 cc/g; and a crush strength of at least 5 pounds when measured on supports having a minimum dimension of 3 mm.

17. A method according to claim 16, further comprising drying and calcinating the catalyst support after forming to the desired shape.

18. A method according to claim 16, wherein the inorganic oxide particles are present in the mixture in an amount ranging from about 50 to 100% on a liquid-free basis, preferably from about 75 to 100% on a liquid-free basis.

19. A method according to claim 16, wherein the inorganic oxide particles are comprised of natural or synthetic hydrated aluminosilicates and are preferably kaolin.

20. A method according to claim 16, wherein the inorganic oxide particles comprise clay particles and the clay content of the inorganic oxide particles ranges from 20 to 100% and preferably from 60 to 100%.

21. A method according to claim 20, wherein the inorganic oxide particles comprise a plurality of inorganic oxide particles bonded together with an inorganic binder, selected from silica, silicic acid, alumina, a hydrated alumina or aluminum chlorohydrol.

22. A method according to claim 21, wherein the inorganic binder component in the inorganic oxide particles is present in an amount ranging from 0 to 50% and preferably from 0 to 25%.

23. A method according to claim 21, wherein the inorganic oxide particles are formed by spray drying a slurry of clay particles and an inorganic binder and forming the mixture into a desired shape.

24. A method according to claim 20, wherein the inorganic oxide particles have a mean diameter ranging from 1 to 1000 μm.

25. A method according to claim 16, wherein the inorganic binder is present in the mixture in an amount ranging from 0 to 50% on a liquid-free basis and preferably from 0 to 25%.

26. A method according to claim 16, wherein the inorganic binder is a metal salt, metal hydroxide or metal oxide.

27. A method according to claim 26, wherein the inorganic binder is silica, silicic acid, alumina, a hydrated alumina or aluminum chlorohydrol.

28. A method according to claim 27, wherein the inorganic binder is alumina or a hydrated alumina which has been peptized with acid.

29. A method according to claim 16, wherein the mixture further comprises an extrusion or forming aid which is present in the mixture in an amount ranging up to 25% on a liquid-free basis.

30. A method according to claim 29, wherein the extrusion or forming aid is a surfactant.

31. A method according to claim 29, wherein the extrusion or forming aid is methyl cellulose.

32. A method according to claim 16, wherein the mixture further comprises a burnout agent and the burnout agent is present in the mixture in an amount ranging up to 25% on a liquid-free basis.

33. A method according to claim 32, wherein the burnout agent is selected from the group consisting of carbon, a natural polymer, a synthetic polymer, starch and methyl cellulose.

34. A method according to claim 16, wherein the mixture further comprises a liquid and the liquid is water.

35. A method according to claim 16, wherein the catalyst support is formed by extrusion, pelletization, balling or granulation.

36. A method according to claim 17, wherein the formed catalyst support is dried at a temperature up to 200° C.

37. A method according to claim 17, wherein the dried support is calcined at a temperature between 200° and 1000° C. and preferably between 200° and 800° C.

* * * * *